May 31, 1966 R. R. GILBERT 3,253,851
ROTATING SLING
Filed Nov. 7, 1963 5 Sheets-Sheet 1

INVENTOR.
ROBERT R. GILBERT
BY
Mandeville & Schweitzer
ATTORNEYS

May 31, 1966 R. R. GILBERT 3,253,851
ROTATING SLING
Filed Nov. 7, 1963 5 Sheets-Sheet 3

INVENTOR.
ROBERT R. GILBERT
BY
Mandeville & Schweitzer
ATTORNEYS

May 31, 1966 R. R. GILBERT 3,253,851
ROTATING SLING
Filed Nov. 7, 1963 5 Sheets-Sheet 4
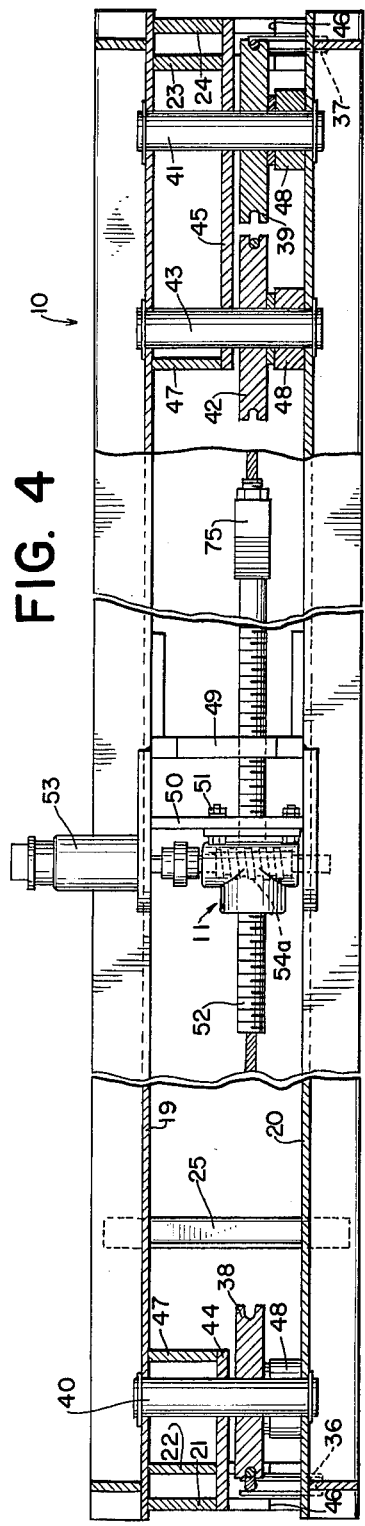
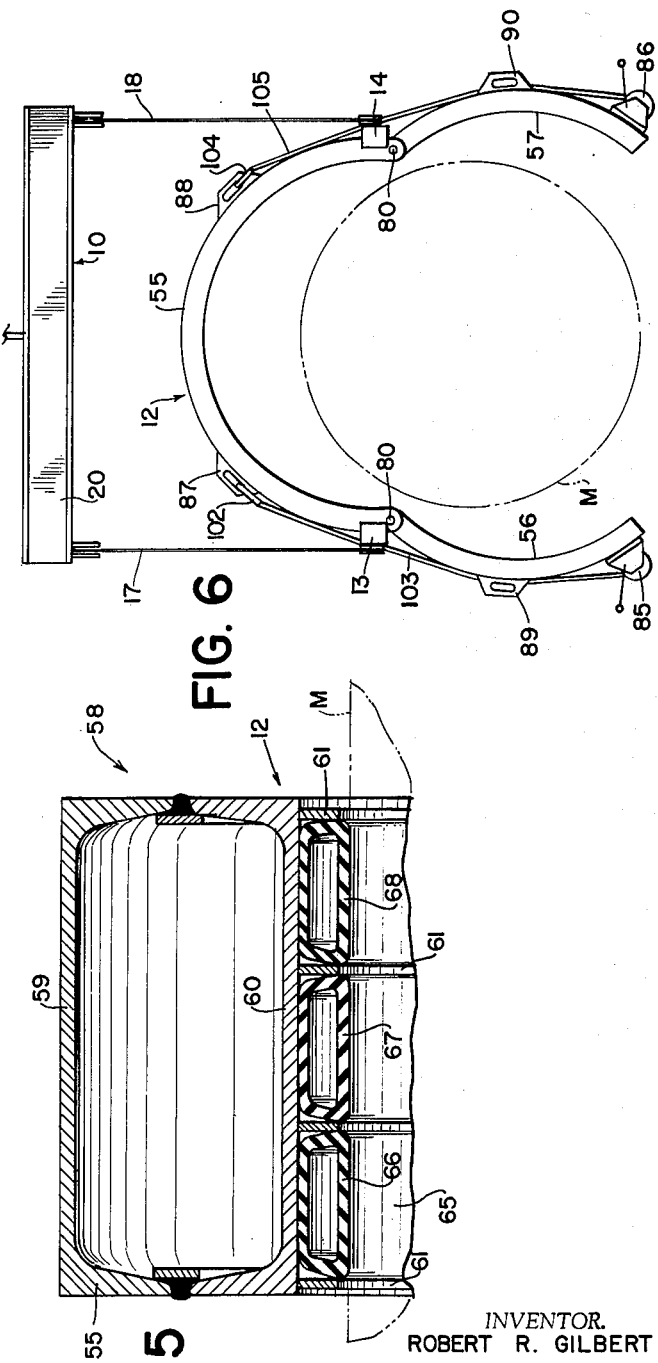
INVENTOR.
ROBERT R. GILBERT
BY
Mandeville & Schweitzer
ATTORNEYS May 31, 1966 R. R. GILBERT 3,253,851
ROTATING SLING
Filed Nov. 7, 1963 5 Sheets-Sheet 5
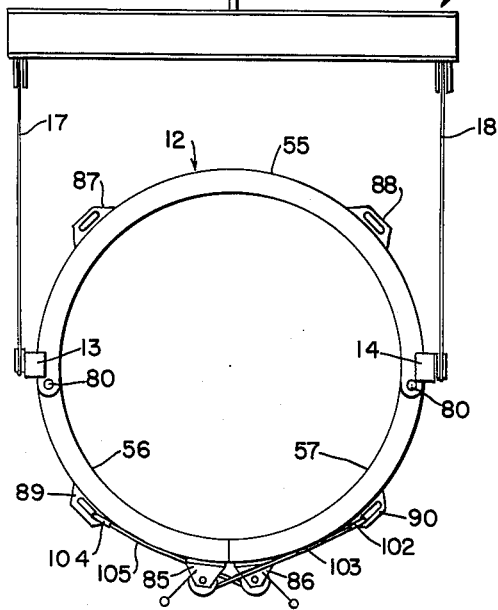
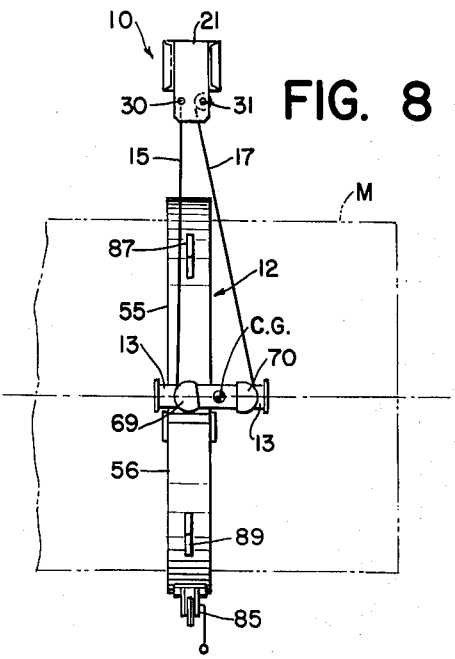
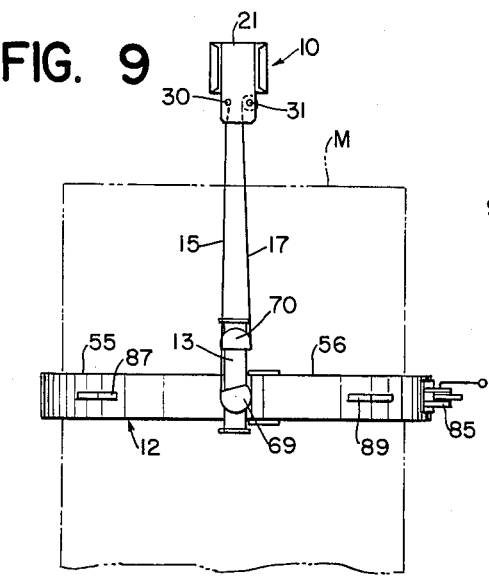
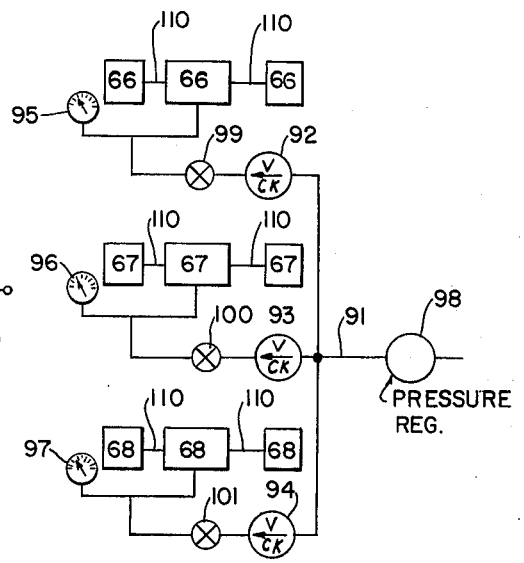
INVENTOR.
ROBERT R. GILBERT
BY
Mandeville & Schweitzer
ATTORNEYS

United States Patent Office 3,253,851
Patented May 31, 1966

3,253,851
ROTATING SLING
Robert R. Gilbert, Pawling, N.Y., assignor to The Presray Corporation, Pawling, N.Y., a corporation of New York
Filed Nov. 7, 1963, Ser. No. 322,237
10 Claims. (Cl. 294—67)

The present invention relates to materials handling equipment, and is directed more particularly to a new and improved hoisting and rotating system adapted especially for handling of cylindrical and other objects having variable or indeterminate centers of gravity yet requiring precise and sensitive handling. Although the apparatus of the invention is contemplated to have broader applications, it is particularly useful in conjunction with pneumatic gripping systems of the type described and claimed in the Hollander et al United States Patent No. 2,894,780.

In the course of manufacture of certain parts and assemblies, often of a substantially cylindrical nature, the center of gravity of the part may be caused to be shifted by the addition of subassamblies or by the removal of material through cutting or machining operations. In the case of parts or assemblies of this type which are of substantial size and weight (e.g., 10,000 to 20,000 pounds), their handling has presented substantial problems and has required substantial and costly pieces of equipment, all of which had tended to introduce excessive cost into the manufacturing operation. Accordingly, it is an ultimate object of the present invention to provide a novel and improved system for handling, lifting, and rotating large and heavy cylindrical and other objects having indeterminate centers of gravity, which is significantly less costly and complicated than has been thought necessary heretofore and yet which accommodates the desired manipulation of the parts with ease and efficiency.

In accordance with one of the specific aspects of the invention, a new and improved gripping and rotating apparatus is provided, for use in conjunction with heavy objects of indeterminate centers of gravity, which is hook-suspended at a single point, but which at the same time is stable and relatively free of unbalancing torque forces, such that an object of extremely large mass may be gripped and rotatively manipulated with ease and precision. It is also a significant aspect of the invention to provide a gripping and manipulating device having the characteristics mentioned which is in the nature of a sling. That is, a gripping unit which is suspended by means of cables, through which support and manipulation of the object is effected, rather than through heavy and complicated positive supporting and manipulating mechanisms, such as gears, hydraulic mechanisms, and the like.

As a more specific aspect of the invention, a gripping unit is suspended from a hook supported lifting frame by two pairs of cables. A linear actuator is carried by the lifting frame and has an actuating element disposed generally along or parallel to a horizontal principal axis of the lifting frame. Controlled operation of the linear actuator causes controlled variation in the length of one of the cable pairs, in a manner which keeps the lifting frame relatively free of unbalancing torque, so that the gripping unit is controllably rotated but the frame does not tilt or skew excessively on its supporting hook.

Another specific feature of the invention resides in the provision of a cable-suspended handling sling of the type and having the characteristics mentioned above, which is arranged for rotative manipulation of an object through 180° and which incorporates a novel cable suspension geometry in order to achieve reliably stable support and manipulation of the object to be handled. In this respect, it is contemplated that the objects to be handled typically will have a principal longitudnal axis and a center of gravity which may vary indeterminately along the axis, within a predetermined range, without varying appreciably away from the axis. The new suspension cable geometry of the invention involves engagement of the gripping unit on its opposite sides at points spaced in the direction of the longitudinal axis of the part to be gripped a distance somewhat greater than the contemplated range of variation of the center of gravity of the part, such that the center of gravity of the part always will be within the suspension points. Further, and more importantly, the suspension cables are connected to the gripping unit about spacing sheaves such that, when the gripping unit is rotated to a position in which the longitudinal axis of the suspended object is generally vertical, the suspension cables at each side of the gripping unit are maintained at a predetermined separation. The spaced cables at each side of the gripping unit thus press inward upon the uppermost one of the spacing sheaves so that the gripping unit and its supported load are firmly stabilized in the desired vertical orientation.

Another specific aspect of the invention resides in the provision of a novel and improved gripping unit for extremely large cylindrical and similarly shaped objects, which enables the object to be gripped and released efficiently and, if necessary, using a single operator. In this connection, the system of the invention contemplates that the object to be gripped may weight up to about 20,000 pounds and have a diameter of, for example, 10 feet. The gripping device of the invention includes a first major arcuate section subtending an angle of slightly more than 180°, sufficient to enable the support facilities to be mounted thereon on a diametral axis of the overall unit, but not sufficiently greater than 180° as to cause the open side of the segment to have a dimension materially less than the diameter. A pair of minor arcuate sections, subtending angles slightly less than 90°, are hinged to the open ends of the major segment and are arranged to be locked in a closed position to form a completed circular ring containing, in the closed position, effectively endless pneumatic gripping elements generally according to the beforementioned Hollander et al. Patent No. 2,894,780. When the minor segments are disengaged and swung open, they form a "mouth" substantially as wide as the diameter of the gripping ring and able to be applied transversely over the object to be gripped. In accordance with the invention, the two minor segments carry closing and opening cable winches which may be alternatively connected to the other minor segments (for drawing the minor segments closed) or to the major segment (for drawing the minor segments open). The arrangement is such that a single operator can manipulate extremely heavy and asymmetrically suspended gripping ring segments, to open the segments or to lock them in closed position for gripping.

A further specific aspect of the invention resides in the provision of a novel and improved pneumatic gripping system adapted especially for extremely large and heavy objects and incorporation of a plurality of independently actuated gripping elements. The system includes a novel pressure fluid system supplying each of the independent grippers through a separate check valve and release valve, whereby the system may be filled with and exhausted of pressure fluid in a minimum of time and whereby accidental loss of pressure in one gripping element is isolated from the remaining elements.

The above and other advantageous features of the invention will be better understood by making reference to the following detailed description and to the accompany drawings, in which:

FIG. 4 is a cross-sectional view taken along line 4—4 of FIG. 2;

FIG. 5 is a cross-sectional view taken along line 5—5 of FIG. 2;

FIG. 6 is a front elevational view showing the lifting mechanism of the invention in an inactive position with its segmented gripping ring opened;

FIG. 7 is a front elevational view showing the lifting mechanism of the invention in an active position with its segmented ring closed;

FIG. 8 is a side elevational view of the lifting mechanism of the invention handling a cylindrical element in a horizontal position;

FIG. 9 is a side elevational view of the lifting mechanism of the invention handling a cylindrical element in a vertical position; and FIG. 10 is a simplified schematic illustration of a pneumatic system for actuating the mechanism of FIG. 1.

Figure 1:
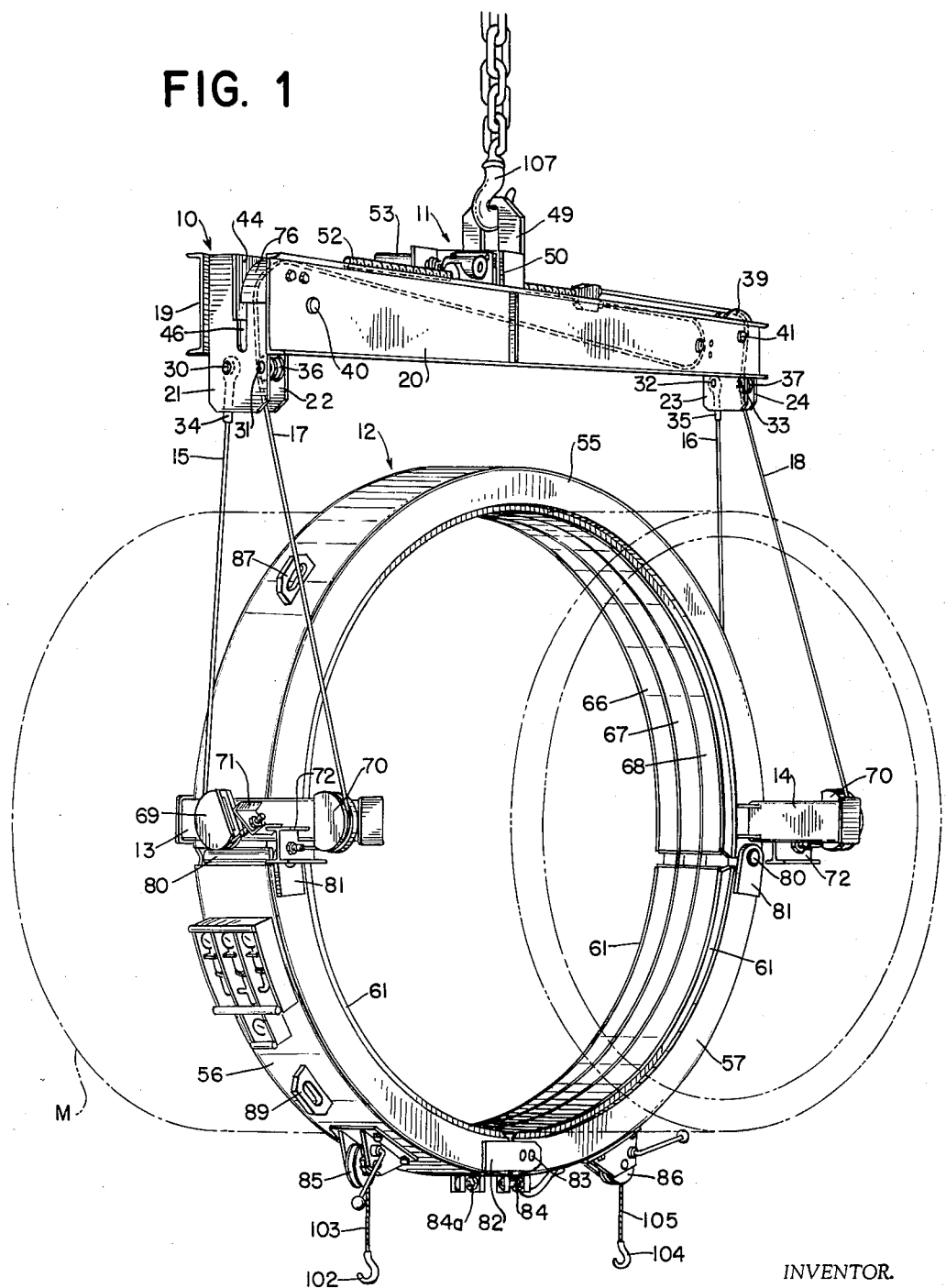
FIG. 1 is a perspective view of a rotating sling mechanism embodying the principles of the present invention.

With reference initially to FIG. 1 of the drawings, the lifting and rotating mechanism of the present invention generally includes a lifting frame or strongback, generally designated by the numeral 10, having a linear actuator mechanism 11 mounted thereon. A multiple-section, hinged gripping ring 12, having handling arms 13 and 14 affixed thereto, is carried by the lifting frame by means of fixed length cables 15, 16 and adjustable cables 17, 18 connected to the linear actuator mechanism 11. Advantageously, the gripping ring 12 incorporates the invention of the beforementioned Hollander et al. Patent No. 2,894,780.

Figure 2:
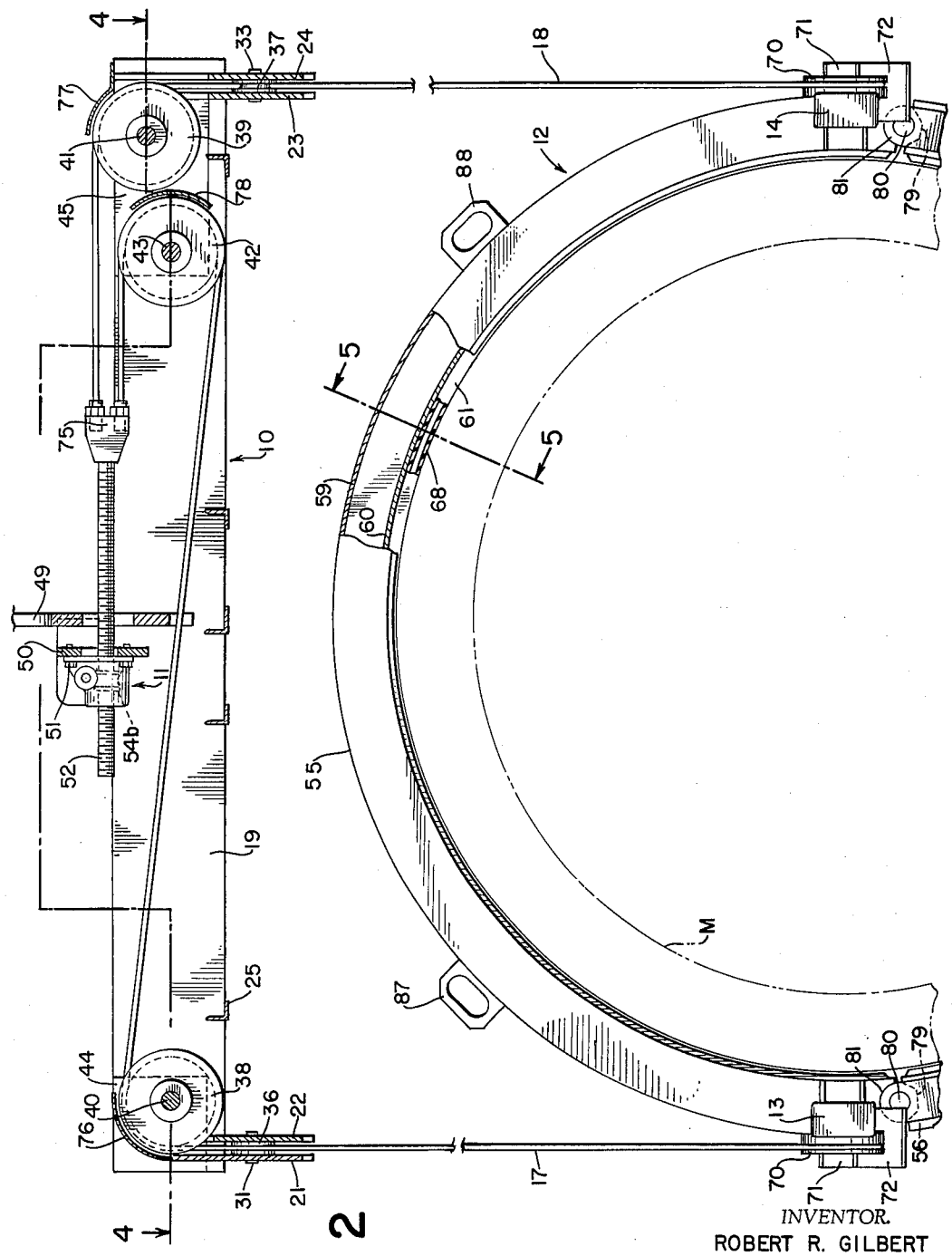
FIG. 2 is a front elevational view of the sling of the present invention with parts broken away to show details of construction.
Figure 3:
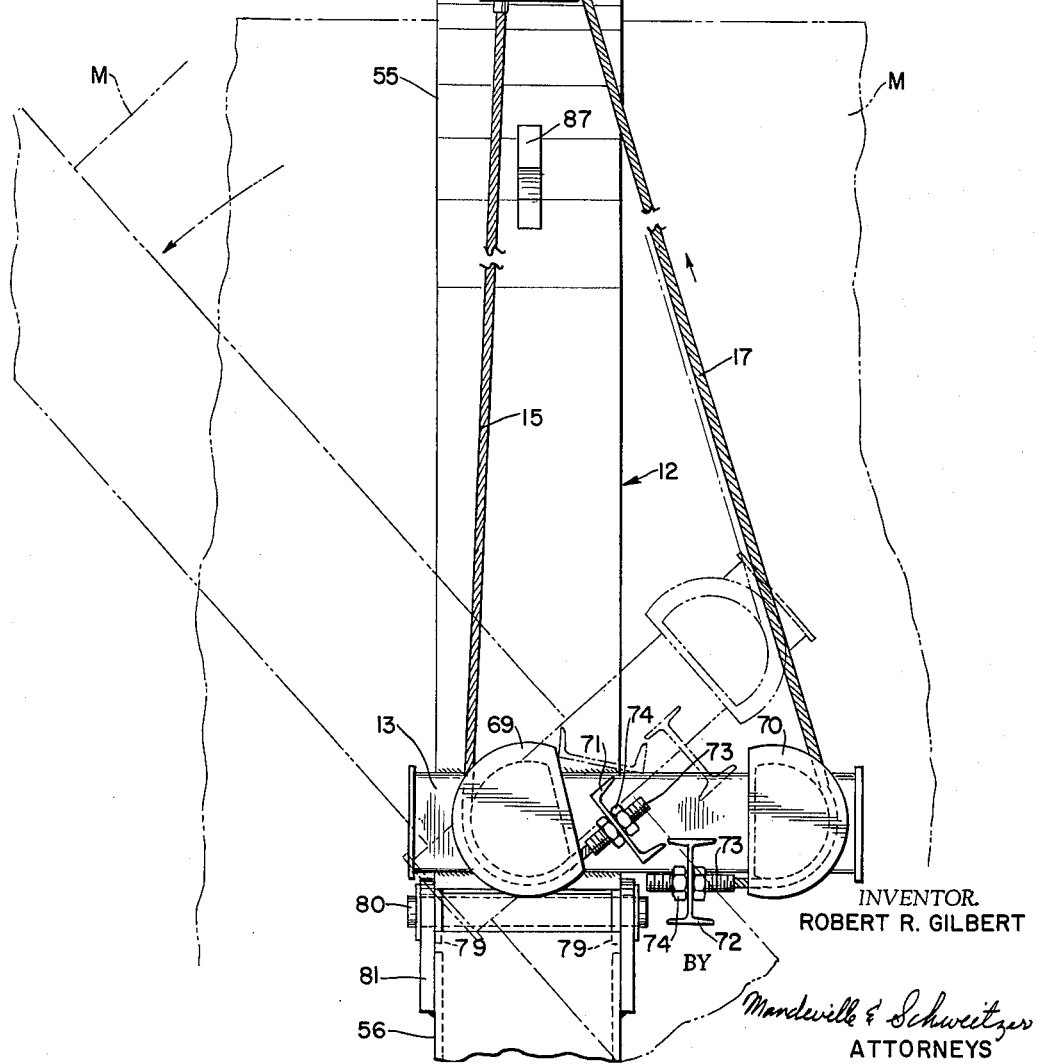
FIG. 3 is a side elevational view of the mechanism of FIG. 1.

In the specifically illustrated system, the lifting frame 10 comprises a pair of longitudinal channel beams 19, 20 maintained in a spaced relation by two pairs of end plates 21, 22 and 23, 24, and suitable intermediate braces 25 welded thereto as best shown in FIGS. 2 and 4. Pins 30, 32 and shafts 31, 33 are supported in a predetermined aligned relationship by the pairs of end plates as shown in FIGS. 1–3, the pins 30, 32 engaging cable ends 34, 35 for pivotal movement while the shafts 31, 33 support small guide sheaves 36, 37 for rotation.

Directly above one edge of and in a plane perpendicular to the planes of the small guide sheaves 36, 37 are located large guide sheaves 38, 39 supported for rotation by shafts 40, 41 extending between the longitudinal channel beams 19, 20, as shown in FIGS. 2 and 4. A reversing sheave 42, typically of equal diameter to the diameters of the guide sheaves 38, 39, is located inwardly of and slightly below the large sheave 39 and is similarly supported for rotation by a shaft 43 mounted by the channel beams 19, 20. As shown in FIG. 4, auxiliary plates 44, 45, mounted parallel with the channel beams in openings 46 in the end plates and braced by transverse plates 47, provide additional support for the shafts 40, 41 and 43.

In accordance with one aspect of the invention and as clearly illustrated in FIG. 4, the sheaves 38, 39 and 42 are all maintained substantially in a common plane between spacers 48 and the auxiliary plates 44, 45. This common plane, advantageously substantially vertical, is generally tangent to the inner edges of the small guide sheaves 36, 37 and is located in close proximity to the cable anchor pins 30, 32. The described arrangement is illustrated in FIG. 3.

Intermediate the ends of the lifting frame 10, a lifting eye 49 and a support plate 50 are welded to the channel members 19, 20 in parallel relation. The lifting eye is disposed along the balance axis of the loaded lifting frame, as will be made more apparent, and is adapted to be engaged by the hook 107 of a suitable crane or mill hoist (not shown) by means of which the entire assembly is raised, lowered and otherwise positioned. Thus, in normal operation, the entire unit may be suspended from a single hook support.

As shown in FIGS. 2–4, a worm jack linear actuator mechanism, indicated generally by the numeral 11, is secured to the support plate 50 on the side thereof opposite from the reversing sheave 42 by suitable means such as bolts 51. The actuator mechanism includes a threaded actuator rod 52 which is located parallel with the channel members and in the plane of the sheaves 38, 39, 42, as shown best in FIG. 4. Power for the actuator rod is supplied by an adjacent air motor 53 mounted on the frame and connected to the actuator rod by a worm 54a and an internally threaded worm wheel 54b (FIGS. 2, 4). The arrangement of the air motor, worm and worm wheel, and the threaded rod is such that the rod is self-holding in any position to which it is driven by the air motor. In other words, axial forces applied to the rod 52 cannot cause movement of the rod, except in accordance with the controlled actuations of the air motor 53.

In accordance with one aspect of the invention, the annular lifting ring 12 is suspended from the lifting frame 10 by a first pair of fixed length cables 15, 16 and a second pair of cables 17, 18 having a variable effective length. Advantageously, the length of the cables is such that the circular gripping unit clears the bottom of the lifting frame relatively close, when the principal longitudinal axis of the gripping unit is horizontal. However, it may be desirable to increase the cable lengths in some instances to accommodate handling of long objects, so that the ends of the objects clear the frame when the objects are turned on a vertical axis.

The annular lifting ring 12 is divided into segments and, as shown best in FIGS. 6 and 7, includes an upper substantially semi-circular ring segment 55 subtending an angle of slightly more than 180° and two lower arcuate ring segments 56, 57 subtending angles of slightly less than 90°. Each of the segments 55–57 includes an arcuate spine portion 58, having a boxlike cross section formed by welding two channels 59, 60 in facing relation, and a series of ribs 61 extending radially inwardly from the spine. It should be understood that the specific construction of the segments 55–57 is dependent upon the weight of the objects being handled. The contemplated structure, for example, is designed to handle cylindrical sections having an outer diameter of about ten feet and weights in the order of 15,000 to 20,000 pounds.

A series (three in the illustrated structure) of arcuate, pneumatic gripping elements 66–68, advantageously having a substantial trapezoidal cross section, as shown in FIG. 5, are supported between the ribs of each ring segment. In the illustrated embodiment, each gripping element comprises three segments extending circumferentially and arranged in butted relation to form effectively endless, circular elements, in accordance with the Hollander et al. patent No. 2,894,780. As will be understood, the pneumatic chamber within each of the elements is adapted to be inflated with a pressure fluid, typically air, to expand the elements radially inward into gripping contact with the section being handled (indicated in the drawings by outline M). The three segments of each unit are connected in series by suitable hose connections 110 (FIG. 10) to constitute integrated, endless pneumatic elements.

Welded to the upper ring segment 55, at the circumferential extremities thereof and on a diametrical plane of the entire circular lifting unit, are the handling arms previously referred to and generally designated by the reference numerals 13, 14. In accordance with the principles of the invention, the arms extend in the diametral plane for a predetermined distance which is greater than the anticipated shift in the center of gravity of the cylindrical parts to be handled, and, in any event for a sufficient length to enable a part, whose center of gravity is somewhat indeterminate, to be gripped, raised and handled in a dependably stable manner. The importance of this relationship will be developed in greater detail hereinafter.

The handling arms are of box-beam construction for increased rigidity and strength, although their specific structure, as with the lifting ring, will be dependent upon and dictated by the loads being handled. Each arm supports a pair of fixed spacing sheaves 69, 70 and anchor beams 71, 72, the anchor beams being secured between the spacing sheaves, as shown best in FIG. 3. As an important feature of the invention, the inner spacing sheaves 69 are mounted on the handling arms such that their centers lie generally on a diametral axis of the lifting ring. In a typical apparatus for handling objects of about 10 feet in diameter, the forward or outer spacing sheaves 70 may be spaced about two feet from the inner sheaves 69. The "offset" of the arms (i.e., the location of one of the inner sheaves 69 on the diametral axis of the lifting ring and the location of the outer sheaves 70 outwardly thereof) is important in the handling of cylindrical objects having closed dome shaped or non-cylindrical ends, which objects have their variable center of gravity in the closed, non-cylindrical end. The "offset" handling arms accommodate the gripping of such objects about their cylindrical portions while maintaining the center of gravity between the spacing sheaves 69, 70. The rearward ends of the handling arms are appropriately counterweighted, as with lead filling, to at least partly balance the entire lifting mechanism as it is suspended from the hook 107.

As shown in FIG. 3, the fixed length cables 15, 16 are connected by the eyelets 34, 35 at their upper ends to the lifting frame 10, and their lower ends are trained about the inner spacing sheaves 69. The cable ends have threaded fittings 73 which are secured to the anchor beams 71, 72 by pairs of adjusting nuts 74 in a manner such that limited adjustment of the lengths of the cables may be effected. The lower ends of the variable length cables 17, 18 are similarly trained about the outer spacing sheaves 70 and are secured to the anchor beams 72 by threaded fittings 73 and pairs of adjusting nuts 74. It should be understood that while the illustrated, preferred embodiment of the invention and the claims include "cables" equivalent means in the nature of chains and the like are contemplated by that expression.

As shown best in FIG. 2, the upper end of the adjustable cable 17 is trained over the large rotatable sheave 38, directed generally longitudinally of the lifting frame, and then trained about the reversing sheave 42. From the reversing sheave it is connected to a special Y-fitting 75 which is threadedly attached to the free end of the threaded actuator rod 52. The other adjustable cable 18 is trained over the sheave 39 and extends horizontally directly above the cable 17 to the special fitting 75, to which it is connected. Guard plates 76, 77, 78 are associated with sheaves 38, 39, 42, respectively, to prevent the cable from becoming disengaged from the sheaves when the apparatus is free of load.

Advantageously, and as reflected best in FIGS. 3 and 4, the sheaves 38, 39, 42 and the actuator rod 52 lie in substantially a common plane, which desirably in a vertical plane in a typical apparatus according to the invention. This simplifies the matter of eliminating undesirable torque forces on the lifting frame when the gripping ring is being manipulated under load.

Immediately below the handling arms and at either extremity of the upper or major gripping ring segment 55 is a transverse hinge plate 79 welded to the spine 58. Supported in the hinge plates 79 are hinge pins 80 which in turn are connected through hinge plates 81 to the lower or minor ring segments 56, 57. At the free ends of the lower segment 56, there is a locking plate 82 which extends generally tangentially and receives a pair of removable locking pins 83. The pins 83 are adapted to be inserted through locating holes at the free ends of the second minor ring segment 57 to align and to hold the lower ring segments 56, 57 in a closed, circular configuration as shown in FIG. 1. A pair of bolts 84, having shouldered stops 84a, extend between the lower segments 56, 57 and are provided to draw the segments together and against the stops to assist in the alignment of the pin-receiving holes.

In accordance with one aspect of the invention, auxiliary opening and closing winches 85, 86 are mounted on the lower segments 56, 57, respectively, to assist in the manipulation of the ring segments, which, as will be undrestood, may be of great weights when made in the large sizes contemplated. In conjunction with the winches, each quadrant of the completed ring has associated therewith a lug, the upper segment having spaced "opening" lugs 87, 88 and the lower segments having single "closing" lugs 89, 90. The operation of the auxiliary opening and closing system for the lifting ring will be dealt with in more detail hereinafter with the description of the operation of the new rotating sling.

Another important aspect of the invention is an improved pneumatic system for actuating and de-actuating the gripping elements (sometimes referred to as "tires") 66-68, which advantageously are of extruded rubber construction. Thus, each of the semi-circular upper segments is pneumatically linked at both extremities by flexible hoses 110 (shown schematically in FIG. 10) to an associated lower segment to form in effect three independently inflatable, endless circular gripping rings. As shown schematically in FIG. 10, a supply manifold 91 is connected to the gripping elements 66-68 through "one-way" or check valves 92, 93, 94, respectively. A pressure regulator valve 98 is provided to control the fluid pressure in the supply manifold, and separate gauges 95-97 are provided in association with each gripping element. In accordance with the invention, separate inflate-deflate valves 99, 100, 101 are provided for each of the gripping elements. The valves 99-101 accommodate removal of the pressure fluid from the gripping elements and, hence, the rapid release of an object being held thereby.

In its operation, the lifting and rotating mechanism of the invention is normally suspended from the hook 107 of a traveling crane or like apparatus as shown in FIG. 1, and may be transported as a unit with or without its load. With the lower segments 56, 57 unlocked and swung outwardly about hinge pins 80 (FIG. 6) the open gripping unit may be lowered transversely onto the cylindrical object to be handled. As will be understood, the segmented gripping ring avoids the need for applying the gripping ring axially over the object, although that may be done if desired.

As an important specific aspect of the invention, the winches 85, 86 and lugs 87, 88 enable a single operator to open the heavy lower segments from a closed position, such as shown in FIG. 7, to prepare the sling for use. Specifically, this may be readily accomplished by placing the hook 102, fixed to the free end of the winch cable 103 of the winch 85, in connecting relation with the opening lug 87 and similarly placing the hook 104, fixed to the free end of the winch cable 105 of the winch 86, in connecting relation with the opening lug 88. Actuation of the winches to wind up the cables will, as shown in FIG. 6, open the lower segments 56, 57 and swing them apart in pivotal movement about the hinge pins 80.

Closing of the opened segments about the section being handled is facilitated and made a one-man operation, in accordance with the invention, by placing the hook 102 into the closing lug 90 and by placing the hook 104 into the closing lug 89. The crossed cables 103, 105 are then wound onto the winch drums to pull the lower segments together. It should be understood that without the auxiliary winch system, opening and closing of the segments could be extremely difficult, requiring the services of more than a single operator, in the case of a large handling apparatus. The difficulty of manually manipulating the segments is magnified as the unit size is increased, thus, the winch system's importance in the handling of large sections may be readily appreciated.

In order to facilitate the release of the locked-together ring segments 56, 57, the crossed cables 103, 105, arranged for closing of the ring as shown in FIG. 7, may be tightened slightly to relieve pressure from the locking pins 83 and the stop bolts 84, enabling them to be removed. The winch cables are then unwound until the ring segments 56, 57 reach their gravity-stable positions, whereupon the winch cables are connected as shown in FIG. 6 in order to draw the segments to their fully open positions.

In the contemplated uses of the new handling apparatus, the center of gravity (C.G.) of the part being handled usually falls somewhere along its central longitudinal axis, as shown in FIG. 8. However, with machining or the addition of subassemblies, the center of gravity may shift somewhat along that axis. This shifting of the center of gravity may present serious problems in the handling of heavy parts during their fabrication or in the handling of differently-sized, finished parts. The new and improved rotating sling, however, can handle a variety of elements having non-uniformly and indeterminately located centers of gravity. Shifting of the center of gravity during fabrication or in the locations of centers of gravity of dissimilar sections is accommodated by the handling arms 13, 14 and the separated spacing sheaves. The separation of the sheaves is arranged to be greater than the predetermined, contemplated shift of the center of gravity of the object to be handled. Thus, when an object, as shown in FIG. 8, is lifted or rotated from the horizontal position, the sling balances it and handles it easily, since the center of gravity will be somewhere between the sheaves. It will be understood in this respect that the length of the handling arms 13, 14, or more specifically the separation of the fixed sheaves 69, 70, will be a function of the contemplated shift of the center of gravity of the object being handled, and/or a function of the tolerance within which the center of gravity may be determined.

Gripping of the object by the lifting ring is accomplished in accordance with the invention by admitting pressure fluid, usually compressed air, into each of the gripping elements 66–68 to inflate them into holding contact with the object. To this end the new and improved actuating system, shown in FIG. 10, may be maintained by the regulator 95 at a pressure in the order of 45 p.s.i. Each of the gripping elements is independent of the others and is inflated through a check valve (92–94) and has its pressure indicated by a separate gauge (95–97). As an important safety feature, the failure of one of the gripping elements will not affect the remaining elements, and gripping pressure therein will be maintained. In accordance with the invention, release of the object from the grip of the pneumatic elements may be accomplished with expedience by exhausting each tire separately and simultaneously through the individual exhaust valves 99–101.

Rotation of the object from the horizontal position of FIG. 8 to the vertical position of FIG. 9 may be accomplished, following the principles of the invention, by shortening the adjustable cables 17, 18 through linear movement of the screw actuator 52. As will be appreciated, the center of gravity will be maintained between the extremities of the spacing sheaves 69, 70 which have, as shown, diameters greater than the spacing of the cables 17, 18 as they are guided into the lifting frame. Advantageously, the separation of the cables 16, 17 at the lifting frame 10 is about one-half their separation at the upper spacing sheaves 70, when the object is rotated to a vertical position, so that both cables 17, 18 press inward on the sheaves 70 to maintain the unit in a stable condition. In addition, the spaced arrangement of the cables at the gripping unit provides a desirable force couple for rotation of the unit in a return from a vertical position.

The provision of linear actuator means for the adjustable cables, in accordance with the invention, minimizes torque forces on the lifting frame during the handling of objects of great mass. In addition, the arrangement enables the overall headroom of the system to be significantly reduced in comparison to more conventional apparatus.

With the apparatus of the invention, sensitive and precise rotative manipulation of a gripped section may be had for 180° of rotation. From the horizontal position of FIG. 8, the object may be rotated upwardly through 90° of travel by shortening the effective length of the cables 17, 18. This is accomplished by actuating the screw 52 to the left (as shown in the drawings) by means of the air motor 53 and its associated self-holding worm drive. If desired, the object may be moved from the position of FIG. 8 downwardly through 90°, or from the position of FIG. 9 downwardly through 180°, or to any intermediate position, by lengthening the cables 16, 17 through displacement of the screw 52 to the right. It will be understood that the length of the screw 52 will be determined by the range of the centers of gravity in the object to be handled, (which in turn determines the separation of the spacing sheaves 69, 70).

An additional safety feature is inherent in the described use of four cables to support and rotate the load. In the event one of the cables fails, the remaining three cables usually can safely maintain the load and prevent possible damage to an object being handled.

From the foregoing description, it should be apparent that the present invention provides a new and improved apparatus for handling, with precision and sensitivity, objects of great size and weight. The use of a segmented gripping ring enables cylindrical objects of unusually large sizes to be encircled from above rather than from the ends. This, of course, accommodates the lifting of objects at central portions from fixtures in which they are supported at both ends and the setting of objects into such fixtures with only a single lifting ring.

In accordance with the invention, objects being handled by the new and improved sling may be gripped without any marking, marring, or deleterious abrasive action of any sort through the use of effectively endless pneumatic rubber elements according to the Hollander et al. Patent No. 2,894,780. Thus, outer surfaces of the object are gripped only by the rubber, itself, which is expanded into contact therewith by carefully controlled actuation. The improved pneumatic control system affords failsafe holding of the object through the use of multiple gripping elements which are severally inflated and deflated. Loss of pressure in one element in no way affects the pressure in the other tires, moreover, the separate exhausting of each pneumatic element accommodates a more rapid and efficient release of gripping pressure than has heretofore been available.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. A handling sling for an object having an indeterminate center of gravity located within an easily approximated predetermined range, comprising
  (a) a horizontally disposed frame structure,
  (b) an annular lifting ring structure,
  (c) inflatable, pressure fluid actuated gripping means carried by said lifting ring for engaging and holding said object,
(d) handling arms fixed to diametrically opposed circumferential portions of said lifting ring and extending axially therefrom, and
(e) variable cable means connecting said frame structure to said handling arms at the inner and outer ends thereof and serving to support said lifting ring,
(f) said handling arms having a predetermined length at least equal to said predetermined range.

2. A sling in accordance with claim 1, in which said variable cable means comprise
(a) a first pair of cables of fixed length, and
(b) a second pair of cables of effectively variable length.

3. A sling in accordance with claim 2, which includes
(a) linear actuator means mounted for horizontal actuating movement on said frame structure and operatively associated with said second pair of cables to change the effective length of said cables between said frame and said lifting ring,
(b) whereby linear movement of said actuator means along said frame structure will effect controlled rotation of said lifting ring.

4. A sling according to claim 3, which includes
(a) rotable sheaves carried by said frame structure,
(b) said second pair of cables being trained about said rotable sheaves and commonly connected to said linear actuator,
(c) said rotable sheave means being disposed in a common plane.

5. A sling according to claim 2, which includes
(a) sheaves fixed to the ends of said handling arms, and
(b) means anchoring said first and second pairs of cables to said handling arms at points between said sheaves,
(c) the cables means being trained about said sheaves.

6. A sling according to claim 5, in which
(a) the cables of said second pair are of predetermined length which may be effectively varied to rotate said ring through 180° about a diametral axis.

7. A materials handling apparatus for rotating heavy objects and the like, comprising
(a) a horizontally disposed lifting frame,
(b) rotable sheaves mounted at the ends of said frame for rotation in a common vertical plane
(c) linear actuator means having a drive screw mounted on said frame intermediate said rotable sheaves and adapted for actuating movement parallel to the horizontal principal axis of said lifting frame,
(d) said drive screw being located in the vertical plane of said sheaves,
(e) a rotatable reversing sheave mounted on said frame in the plane of said first mentioned rotatable sheaves,
(f) a gripping element for gripping an object to be handled,
(g) a first pair of cables fixedly connected between the end portions of said lifting frame and predetermined points on said gripping element, and
(h) a second pair of cables connected to said gripping element at points spaced from said predetermined points,
(i) said second cables being trained over said sheaves and connected to said drive screw,
(j) whereby predetermined displacements of said drive screw will effectively vary the lengths of said second cables between said lifting frame and said gripping element to cause rotation of said gripping element.

8. The apparatus of claim 7, in which
(a) said gripping element is of a substantially circular configuration,
(b) a pair of handling arms extend outwardly from said lifting element at diametrically opposed portions thereof, and
(c) said first and second cables are connected to said handling arms.

9. An opening and closing system for a materials handling apparatus having a plurality of ring-like segments which cooperate to form a substantially circular, lifting ring, comprising
(a) a major ring segment,
(b) first and second minor ring segments,
(c) hinge means articulating said minor ring segments to said major ring segment,
(d) locking means connecting the free ends of said minor ring segments,
(e) said major and minor ring segments when locked forming a lifting ring of 360°,
(f) winch means mounted on said first and second minor ring segments,
(g) said winch means including operating cables having variable effective lengths, and
(h) lug means mounted on each of said segments in each of the quadrants of said lifting ring,
(i) the cable carried by one minor ring segment being selectively and alternatively fastenable to the lug means of the other minor ring segment and of the major ring segment and while so fastened being adapted to be effectively shortened and lengthened by said winch means to effect opening and closing of said lifting ring, 10. A hook-supported sling type apparatus for supporting and rotatively manipulating heavy objects, comprising
(a) a lifting frame having means forming a lifting eye thereon for engagement by a crane hook or the like,
(b) a gripping element for engaging the objects to be supported,
(c) a first pair of fixed length cables connected at their upper ends to said lifting frame on opposite sides of the lifting eye,
(d) said first pair of cables extending downward and being connected to said opposite sides of said gripping element in regions adjacent a plane defined by the longitudinal axis of said gripping element and a horizontal axis intersecting said longitudinal axis and extending from one side to the other of said gripping element,
(e) a second pair of cables extending downward from said lifting frame on opposite sides of said lifting eye and being connected to opposite sides of said gripping element in regions adjacent said plane and spaced from said first named regions in the direction of said longitudinal axis,
(f) a pair of guide sheaves mounted adjacent opposite ends of said lifting frame substantially in a common plane and serving to guide said second cables substantially in said common plane,
(g) said common plane being a vertical plane positioned closely adjacent the points of connection of said fixed-length cables to said lifting frame,
(h) linear actuator means carried by said lifting frame and acting substantially in said common plane,
(i) said linear actuator means engaging the cables of said second pair for simultaneously and equally varying the effective length thereof,
(j) one cable of said second pair extending vertically upward, around one of said guide sheaves, and generally horizontally inward to said linear actuator, and
(k) a reversing sheave mounted on said lifting frame, substantially in said common plane, and positioned between said linear actuator and said one sheave,
(l) the other cable of said second pair extending vertically upward, around the other of the guide sheaves, generally horizontally across to said reversing sheave, around said reversing sheave and generally horizontally in the opposite direction, and parallel to and along with said one cable, to said linear actuator.

References Cited by the Examiner

UNITED STATES PATENTS

| | | | |
|---|---|---|---|
| 2,076,758 | 4/1937 | Whiting | 294—74 |
| 2,279,570 | 4/1942 | Kamppi | 294—112 |
| 2,775,869 | 1/1957 | Pointer | 294—86 X |
| 2,894,780 | 7/1959 | Hollander | 294—67 X |
| 3,164,406 | 1/1965 | Barry | 294—81 X |
| 3,191,787 | 6/1965 | Stearn | 294—74 X |

FOREIGN PATENTS 657,669 2/1963 Canada.

OTHER REFERENCES

Germany, printed application 1,130,131, March 1962, (Kl 35b-6-08).

GERALD M. FORLENZA, *Primary Examiner.*

SAMUEL F. COLEMAN, *Examiner.*

GEORGE F. ABRAMS, *Assistant Examiner.*